(12) United States Patent
Cha

(10) Patent No.: US 9,487,150 B2
(45) Date of Patent: Nov. 8, 2016

(54) DISPLAY DEVICE HOLDER APPARATUS FOR SUN VISOR

(71) Applicant: Hyundai Motor Company, Seoul (KR)

(72) Inventor: Seung Kwon Cha, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 29 days.

(21) Appl. No.: 14/495,555

(22) Filed: Sep. 24, 2014

(65) Prior Publication Data

US 2015/0084364 A1    Mar. 26, 2015

(30) Foreign Application Priority Data

Sep. 26, 2013  (KR) .................. 10-2013-0114543

(51) Int. Cl.
| | |
|---|---|
| *B60R 7/05* | (2006.01) |
| *B60J 3/02* | (2006.01) |
| *B60R 11/02* | (2006.01) |
| *B60R 11/00* | (2006.01) |

(52) U.S. Cl.
CPC ................ *B60R 7/05* (2013.01); *B60J 3/0278* (2013.01); *B60R 11/0235* (2013.01); *B60R 2011/0035* (2013.01); *B60R 2011/0071* (2013.01); *B60R 2011/0075* (2013.01); *B60R 2011/0084* (2013.01)

(58) Field of Classification Search
CPC ............ B60R 7/05; B60R 2011/0075; B60R 2011/0084; B60R 11/0235; B60J 3/0278
See application file for complete search history.

(56) References Cited

U.S. PATENT DOCUMENTS 4,652,982 A * 3/1987 Flowerday ........... B60Q 3/0226
296/97.5
2005/0200696 A1   9/2005 Schedivy

FOREIGN PATENT DOCUMENTS

| JP | 2004155316 A | * | 6/2004 |
|---|---|---|---|
| KR | 2002-0040181 A | | 5/2002 |
| KR | 10-2005-0007209 A | | 1/2005 |
| KR | 20-2010-0006032 U | | 6/2010 |

* cited by examiner

*Primary Examiner* — Glenn Dayoan
*Assistant Examiner* — Melissa A Black
(74) *Attorney, Agent, or Firm* — Morgan, Lewis & Bockius LLP

(57) ABSTRACT

A display device holder apparatus for a sun visor may include a slide bracket slidably coupled to the sun visor in order to enable a state in which it may be received in the sun visor and a state in which it may be drawn forwardly from the sun visor, and a plurality of holders provided in the slide bracket, so as to be elastically rotatable with respect to the slide bracket and fixing a display device so that the display device may be held in the slide bracket.

11 Claims, 4 Drawing Sheets

DISPLAY DEVICE HOLDER APPARATUS FOR SUN VISOR

CROSS REFERENCE TO RELATED APPLICATION

The present application claims priority to Korean Patent Application No. 10-2013-0114543, filed Sep. 26, 2013, the entire contents of which may be incorporated herein for all purposes by this reference.

BACKGROUND OF THE INVENTION

Field of the Invention

Relates to a display device holder apparatus for a sun visor capable of holding a display device such as a personal mobile phone using a sun visor provided in a vehicle.

Description of Related Art

Generally, sun visors provided in a vehicle, which may be used to block sunlight introduced into the interior of the vehicle through a front window glass or a door window, may be generally rotatably mounted at portions connected to the front window glass on a roof panel in front of a driver's seat and a passenger's seat, respectively.

The sun visors serve to block the sunlight and have mirrors additionally mounted therein in order to improve convenience of passengers.

Meanwhile, in accordance with the development of an information technology (IT), most of the vehicle passengers have possessed a personal mobile phone, and in the case of a privately-owned vehicle, a vehicle owner separately purchases a holder for holding the mobile phone and mounts the holder in the vehicle or receives and uses the mobile phone in a reception space (for example, a cup holder, or the like) provided in the vehicle in the case in which the holder may be not present.

Therefore, when a display device such as the personal mobile phone may be held by using the sun visors provided at the driver's seat and the passenger's seat, a disadvantage of separately purchasing the holder and mounting the holder in the vehicle may be solved, and convenience of the passenger may be improved, thereby making it possible to significantly assist in improving marketability of the vehicle.

The information included in this Background of the Invention section may be only for enhancement of understanding of the general background of the invention and should not be taken as an acknowledgement or any form of suggestion that this information forms the prior art already known to a person skilled in the art.

BRIEF SUMMARY

Various aspects of the present invention may be directed to providing a display device holder apparatus for a sun visor capable of improving convenience of a passenger by installing a holder apparatus that may hold a display device such as a personal mobile phone in a sun visor for a vehicle and assisting in improving marketability of the vehicle through the improvement of the convenience of the passenger.

A display device holder apparatus for a sun visor, may include a slide bracket slidably coupled to the sun visor in order to enable a state in which it may be received in the sun visor and a state in which it may be drawn forwardly from the sun visor, and a plurality of holders provided in the slide bracket, so as to be elastically rotatable with respect to the slide bracket and fixing a display device so that the display device may be held in the slide bracket.

The display device holder apparatus for the sun visor may further include a base bracket fixedly installed in the state in which it may be received in the sun visor and having guide grooves formed in both side surfaces thereof in order to guide movement of the slide bracket in forward and backward directions, and guide protrusions protruding integrally from the slide bracket on both side surfaces of the slide bracket configured to be moved along the guide grooves and move the slide bracket in the forward and backward directions.

The display device holder apparatus for the sun visor may include a stopper groove in the base bracket so as to be opened toward the slide bracket, and a stopper stopping movement of the slide bracket when the slide bracket may be in the state in which it may be received in the sun visor, installed at the slide bracket through a stopper spring, and inserted into the stopper groove.

The holder may include a lower holder rotatably coupled to a lower end of the slide bracket through a lower shaft, and a pair of side holders rotatably installed at both sides of the slide bracket.

The display device holder apparatus for the sun visor may further include pad members coupled integrally to the side holders and friction-contacting the display device to prevent movement of the display device and prevent damage to the display device.

The lower holder may be configured to be pivotally rotated around the lower shaft due to a weight of the lower holder to be changed into an open state in which the display device may be held, when the slide bracket may be changed from a received state into a drawn state.

Holder protrusions rotating the lower holder to change the lower holder from an open state into a closed state in which the display device may be not held by a contact with the base bracket when the slide bracket may be changed from a drawn state into a received state protrude integrally with portions of the lower holder through which the lower shaft penetrates.

The display device holder apparatus for the sun visor may further include a pair of extension brackets slidably installed with respect to the slide bracket in order to enable a state in which they may be received in the slide bracket and a state in which they may be drawn toward a left and a right of the slide bracket, respectively, and a return spring installed to connect the pair of extension brackets to each other and maintain the pair of extension brackets in a state in which the pair of extension brackets may be received in the slide bracket by providing an elastic force to the extension brackets.

The side holders may be rotatably installed on end portions of the extension brackets through side shafts, respectively.

The display device holder apparatus for the sun visor may further include holder springs each having one end coupled to each side holder and another end coupled to each extension bracket and providing elastic force to the side holders so that the side holders may be continuously closely adhered to the extension brackets in a state in which they may be folded.

The slide bracket may include a front bracket having the guide protrusions formed at both sides thereof, and provided with the stopper, the lower holder, the side holders, and the extension brackets, and a rear bracket coupled to the front bracket, covering the front bracket, installed facing the base bracket, and limiting movement of the stopper in order to prevent the stopper from being separated toward the base bracket.

The slide bracket may be installed positioned on a surface of the sun visor directed toward an interior of the sun visor when the sun visor may be folded and closely adhered to a roof panel.

It may be understood that the term "vehicle" or "vehicular" or other similar term as used herein may be inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle may be a vehicle that has two or more sources of power, for example both gasoline-powered and electric-powered vehicles.

The methods and apparatuses of the present invention have other features and advantages which will be apparent from or may be set forth in more detail in the accompanying drawings, which may be incorporated herein, and the following Detailed Description, which together serve to explain certain principles of the present invention.

It should be understood that the appended drawings may be not necessarily to scale, presenting a somewhat simplified representation of various features illustrative of the basic principles of the invention. The specific design features of the present invention as included herein, including, for example, specific dimensions, orientations, locations, and shapes will be determined in part by the particular intended application and use environment.

DETAILED DESCRIPTION

Reference will now be made in detail to various embodiments of (s), examples of which may be illustrated in the accompanying drawings and described below. While the invention(s) will be described in conjunction with exemplary embodiments, it will be understood that the present description may be not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
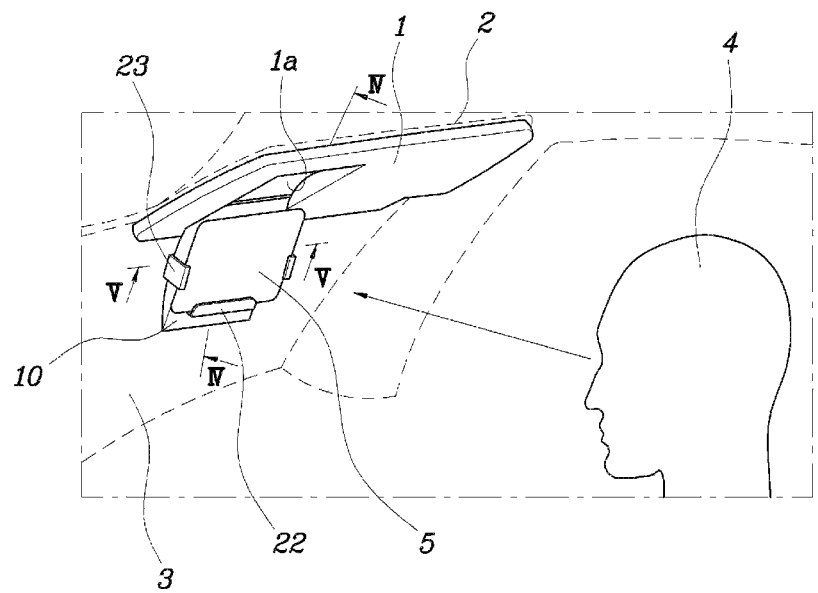
FIG. 1 is a view showing a state in which an exemplary display device holder apparatus for a sun visor according to the present invention is used.
Figure 2:
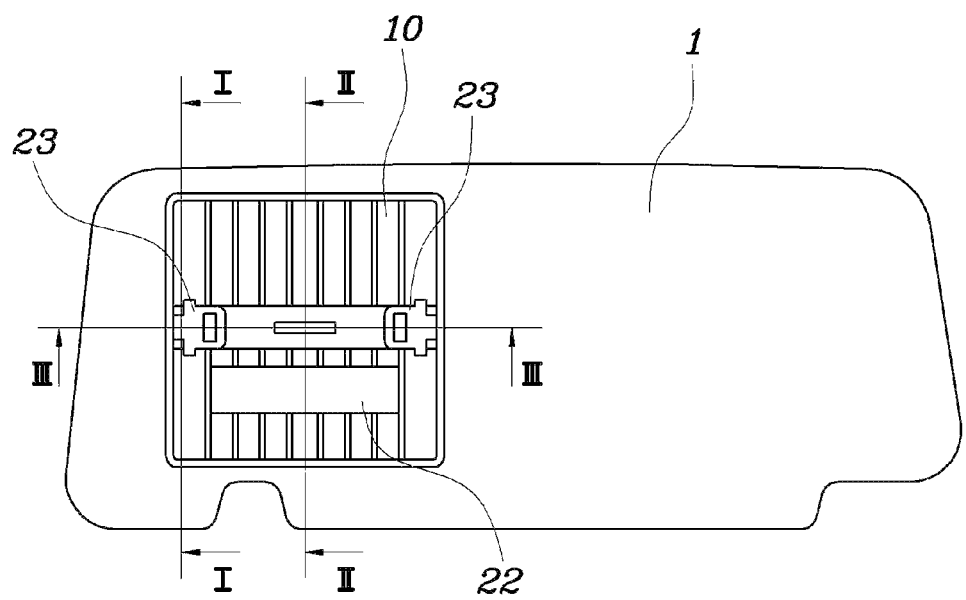
FIG. 2 is a view showing a state before the exemplary display device holder apparatus for the sun visor according to the present invention is used.
Figure 3:
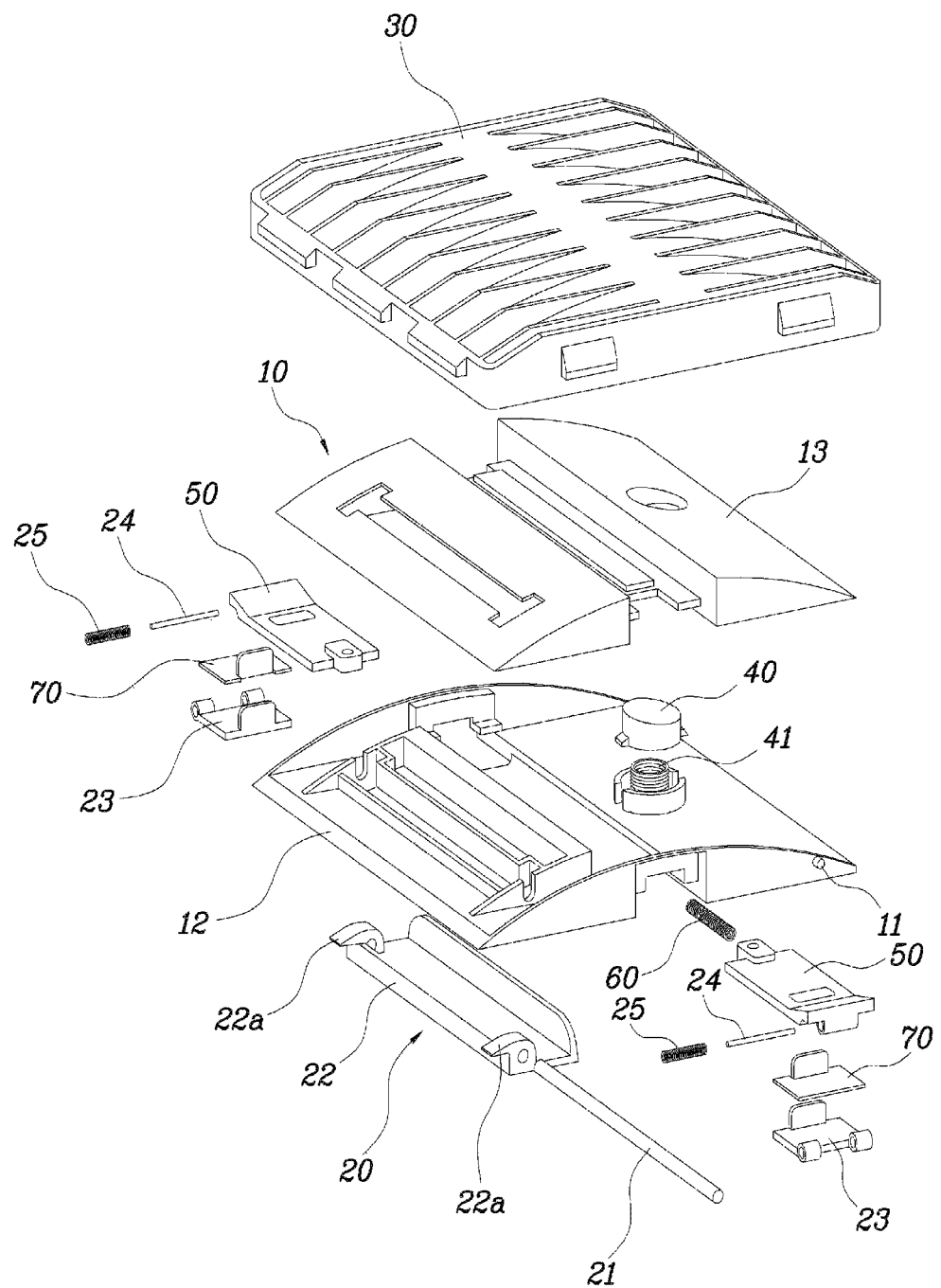
FIG. 3 is an exploded perspective view of the exemplary display device holder apparatus for the sun visor according to the present invention.

Sun visors 1 for a vehicle are rotatably mounted at portions connected to a front window glass 3 on a roof panel 2 in front of a driver's seat and a passenger's seat, respectively, as shown in FIG. 1. When the sun visors 1 are not used, the sun visors 1 are closely adhered to the roof panel 2 to secure a front visual field, as shown in FIG. 1, and when the sun visors 1 are used in order to block sunlight, the sun visors 1 are rotated toward a front in which the front window glass 3 is present or toward the door window and are used.

The display device holder apparatus for a sun visor according to various aspects of the present invention is a component provided in the sun visor 1. That is, the display device holder apparatus for a sun visor according to the present invention is a component installed so as to be positioned on one surface of the sun visor 1 directed toward the interior when the sun visor 1 is in a state in which the sun visor 1 is folded so as to be closely adhered to the roof panel 2. To this end, one surface of the sun visor 1 is provided with a groove 1*a* of a reception space in which the display device holder apparatus for a sun visor may be installed.

Therefore, a passenger 4 draws the display device holder apparatus for a sun visor downwardly from the sun visor 1 as shown in FIG. 1, holds a display device 5 on the drawn display device holder apparatus for a sun visor, and gazes at the display device 5 in a comfortable state.

The display device holder apparatus for a sun visor as described above is installed in both of the sun visors 1 of the driver's seat and the passenger's seat.

The display device holder apparatus for a sun visor according to the present invention includes a slide bracket 10 installed so as to be slidable with respect to the sun visor 1 in order to enable a state in which it is received in the sun visor 1 and a state in which it is drawn forwardly from the sun visor 1, and a plurality of holders 20 provided in the slide bracket 10 so as to be elastically rotatable and fixing the display device 5 so that the display device 5 is held in the slide bracket 10, as shown in FIGS. 1 to 8.

In addition, the display device holder apparatus for a sun visor according to the present invention further includes a base bracket 30 fixedly installed in a state in which it is received in the sun visor 1 and having guide grooves 31 formed in both side surfaces thereof in order to guide movement of the slide bracket 10 in forward and backward directions, and guide protrusions 11 protruding integrally from the slide bracket 10 on both side surfaces of the slide bracket 10 and moved along the guide grooves 31 in order to move the slide bracket 10 in the forward and backward directions.

Figure 4:
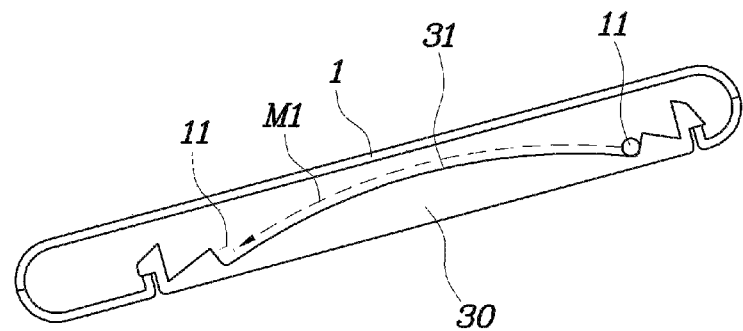
FIG. 4, FIG. 5 and FIG. 6 is cross-sectional views taken along line I-I, line II-II, and line III-III of FIG. 2, respectively, showing a state before the exemplary display device holder apparatus for the sun visor according to the present invention is used.
Figure 5:
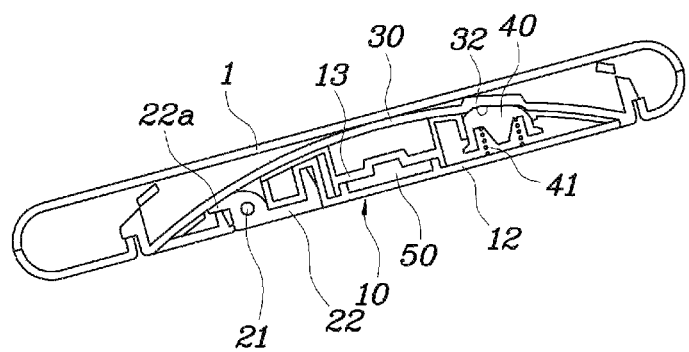
Figure 6:
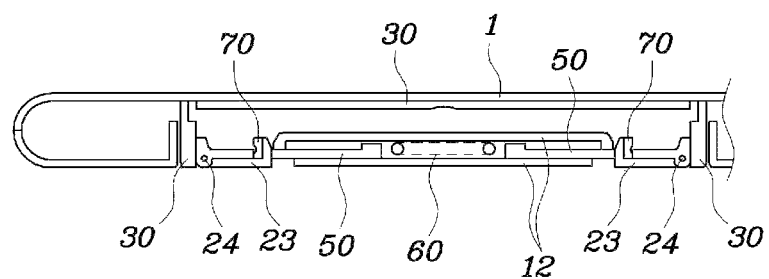

When the slide bracket 10 is received in the sun visor 1, the guide protrusion 11 is positioned at a right distal end of the guide groove 31, as shown in FIG. 4, when an operation in which the slide bracket 10 is drawn from the sun visor 1 is performed, the guide protrusion 11 is moved leftward along the guide groove 31 as shown in an arrow M1, and when the operation in which the slide bracket 10 is drawn from the sun visor 1 is completed, the guide protrusion 11 is positioned at a position denoted by a dotted circle at a left distal end of the guide groove 31.

In addition, the display device holder apparatus for a sun visor according to the present invention further includes a stopper groove 32 in the base bracket 30 so as to be opened toward the slide bracket 10, and a stopper 40 stopping movement of the slide bracket 10 when the slide bracket 10 is in a state in which it is received in the sun visor 1, installed at the slide bracket 10 through a stopper spring 41, and inserted into the stopper groove 32.

When a user applies force to the slide bracket 10 in order to draw the slide bracket 10, the stopper 40 is easily separated from the stopper groove 32. To this end, surfaces of the stopper groove 32 and the stopper 40 is curved surfaces having an arc shape.

In addition, each of the holders 20 includes a lower holder 22 rotatably coupled to a lower end of the slide bracket 10 through a lower shaft 21, and a pair of side holders 23 positioned at both sides of the slide bracket 10 and rotatably installed.

In addition, the display device holder apparatus for the sun visor according to further includes a pair of extension brackets 50 installed so as to be slidable with respect to the slide bracket 10 in order to achieve a state in which they are received in the slide bracket 10 and a state in which they are drawn toward the left and the right of the slide bracket 10, respectively, and a return spring 60 installed so as to connect the pair of extension brackets 50 to each other and providing elastic force to the extension brackets 50 so as to maintain the pair of extension brackets 50 in a state in which the pair of extension brackets 50 are received in the slide bracket 10.

Meanwhile, the side holders 23 are not directly installed on the slide bracket 10, but are rotatably installed on end portions of the extension brackets 50 through side shafts 24, respectively.

Therefore, after the pair of extension brackets 50 are extended to the side surfaces of the slide bracket 10 so as to be in accord with a size of an appearance of the display device 5, the display device 5 is fixed using the side holders 23 coupled to the extension brackets 50.

When the side holders 23 are not used, they should be maintained in a state in which they are closely adhered to the extension brackets 50. To this end, the display device holder apparatus for a sun visor according to the present invention further includes holder springs 25 installed so as to each have one end coupled to the side holders 23 and the other end coupled to the extension brackets 50 to provide elastic force to the side holders 23.

In addition, when the display device 5 is fixed by the side holders 23, a direct contact between the display device 5 and the side holders 23 should be prevented to prevent damage to the display device 5, and movement of the display device 5 should be prevented through a friction contact with the display device 5. To this end, the display device holder apparatus for a sun visor according to the present invention further includes pad members 70 coupled integrally to the side holders 23.

That is, the pad members 70, which are fixedly installed at portions of the side holders 23 contacting the display device 5, are generally made of rubber, flexible silicon, or the like, that may friction-contact the display device 5 and absorb impact, but are not limited thereto.

Meanwhile, when the slide bracket 10 is changed from being in a received state into a drawn state from the visor 1, the lower holder 22 is rotated around the lower shaft 21 due to its own weight to thereby be changed into an open state in which the display device 5 is held. This structure may assist in improving convenience of the user.

In addition, when the slide bracket 10 is changed from the drawn state into the received state, the lower holder 22 that is in the open state is rotated due to its own weight so as to be in a closed state in which the display device 5 may not be held even though the lower holder 22 is not manipulated by the user. To this end, the display device holder apparatus for a sun visor according to the present invention has a structure in which holder protrusions 22a protrude integrally from portions of the lower holder 22 through which the lower shaft 21 penetrates.

The holder protrusions 22a contact the base bracket 30 when the slide bracket 10 is changed from the drawn state into the received state, such that the lower holder 22 is automatically changed from the open state in which the display device 5 is held into the closed state in which the display device 5 may not be held, which may also assist in improving the convenience of the user.

In addition, the slide bracket 10 according to the present invention includes a front bracket 12 having the guide protrusions 11 formed at both sides thereof, and provided with the stopper 40, the lower holder 22, the side holders 23, and the extension brackets 50, and a rear bracket 13 coupled to the front bracket 12 so as to cover the front bracket 12, installed so as to face the base bracket 30, and limiting movement of the stopper in order to prevent the stopper 40 from being separated toward the base bracket 30.

Hereinafter, an operation of the display device holder apparatus for a sun visor according to various embodiments of the present invention will be described.

FIGS. 2, 4, 5 and 6 show a state before the display device holder apparatus for a sun visor according to the present invention is used. In this case, the slide bracket 10 is maintained in a state in which it is received in the sun visor 1.

Figure 7:
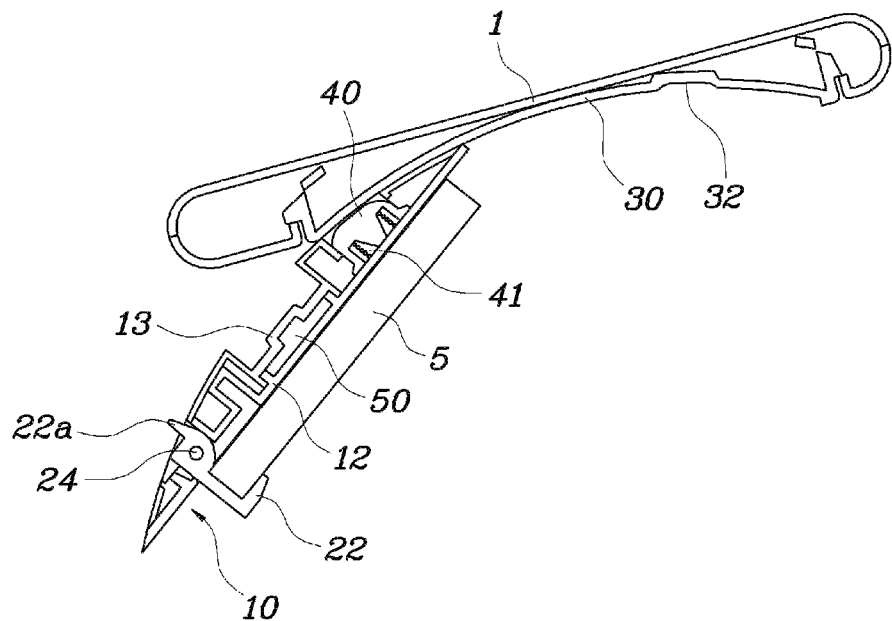
FIGS. 7 and 8 is cross-sectional views taken along line IV-IV and line V-V of FIG. 1, respectively, showing a state in which the exemplary display device holder apparatus for the sun visor according to the present invention is used.
Figure 8:
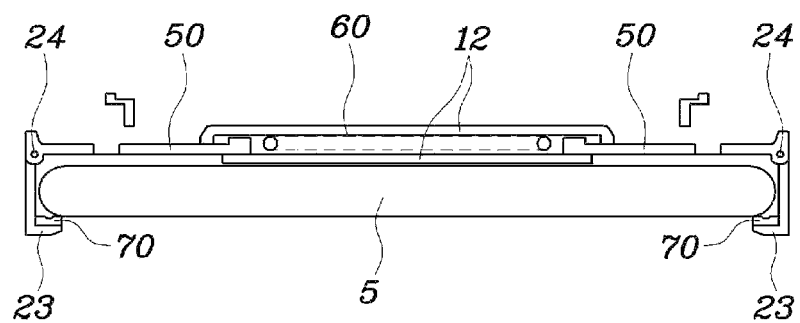

In this state, when the user draws the slide bracket 10 downwardly, the stopper 40 is separated from the stopper groove 32. At the same time, the guide protrusion 11 of the slide bracket 10 is moved along the guide groove 31 of the base bracket 30 (See an arrow M1 of FIG. 4). As a result, the slide bracket 10 received in the sun visor 1 is drawn from the sun visor 1 as shown in FIGS. 1, 7, and 8.

When an operation in which the slide bracket 10 is drawn from the sun visor 1 is performed, the lower holder 22 is rotated around the lower shaft 21 due to its own weight to thereby be changed into an open state in which the display device 5 is held.

In addition, when the operation in which the slide bracket 10 is drawn from the sun visor 1 is completed, a user pulls out and extends the pair of extension brackets 50 to the side surfaces of the slide bracket 10 so as to be in accord with the size of the appearance of the display device 5 and then rotates the side holders 23 provided on the extension brackets 50 to hold the display device 5 using the lower holder 22 and the side holders 23 as shown in FIG. 1.

Therefore, the passenger of the vehicle may gaze at the held display device 5 in a comfortable state using the display device holder apparatus for the sun visor according to the present invention while he/she sits on a seat.

When the user pulls the display device 5 from the lower holder 22 and the side holders 23 in order to again receive the drawn slide bracket 10 in the sun visor 1 after the use of the display device holder apparatus for the sun visor according to the present invention ends, the side holders 23 are folded so as to be in a state in which they are closely adhered to the extension brackets 50 by restoring force of the holder springs 25. At the same time, the pair of extension brackets 50 protruding to the side surfaces of the slide bracket 10 are again received automatically in the slide bracket 10 by restoring force of the return spring 60.

In addition, when the user pushes the slide bracket 10 drawn from the sun visor 1 toward the sun visor 1 in order to receive the slide bracket 10 in the sun visor 1, the holder protrusions 22a formed at the lower holder 22 contact the base bracket 30, and the lower holder 22 is automatically changed from the open state in which the display device 5 is held into the close state in which the display device 5 may not be held by continuous movement of the slide bracket 10.

In addition, when the reception of the slide bracket 10 in the sun visor 1 is completed, the stopper 40 provided in the slide bracket 10 is inserted into the guide groove 31 provided in the base bracket 30. Therefore, movement of the slide bracket 10 of which a reception operation is completed is prevented by stopping force of the stopper 40 inserted into the guide groove 31, such that the slide bracket 10 is continuously maintained in a received state.

As set forth above, according to an exemplary embodiment of the present invention, the display device 5 such as a personal mobile phone is conveniently and easily held using the sun visor 1 provided in the vehicle, thereby making it possible to significantly improve convenience of the passenger of the vehicle and contribute to improvement of marketability of the vehicle.

In addition, according to an exemplary embodiment of the present invention, the display device 5 such as the personal mobile phone is conveniently and easily held using the sun visor 1, such that a holder for holding the display device 5 does not need to be separately purchased. Therefore, cost reduction is promoted.

For convenience in explanation and accurate definition in the appended claims, the terms "upper", "lower", "inner" and "outer" may be used to describe features of the exemplary embodiments with reference to the positions of such features as displayed in the figures.

The foregoing descriptions of specific exemplary embodiments of the present invention have been presented for purposes of illustration and description. They may be not intended to be exhaustive or to limit the invention to the precise forms included, and obviously many modifications and variations may be possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It may be intended that the scope of the invention be defined by the Claims appended hereto and their equivalents.

What is claimed is:

1. A display device holder apparatus for a sun visor, comprising:
   a slide bracket slidably coupled to the sun visor in order to enable a state in which the slide bracket is received in the sun visor and a state in which the slide bracket is drawn forwardly from the sun visor;
   a plurality of holders provided in the slide bracket, so as to be elastically rotatable with respect to the slide bracket and fixing a display device so that the display device is held in the slide bracket; and
   a base bracket fixedly installed in the state in which the base bracket is received in the sun visor;
   a stopper groove formed in the base bracket so as to be opened toward the slide bracket; and
   a stopper stopping movement of the slide bracket when the slide bracket is in the state in which the slide bracket is received in the sun visor, installed at the slide bracket through a stopper spring, and inserted into the stopper groove.

2. The display device holder apparatus for the sun visor of claim 1,
   wherein the base bracket includes guide grooves formed in both side surfaces thereof in order to guide movement of the slide bracket in forward and backward directions; and
   wherein guide protrusions protruding integrally from the slide bracket on both side surfaces of the slide bracket are configured to be moved along the guide grooves and move the slide bracket in the forward and backward directions.

3. The display device holder apparatus for the sun visor of claim 1, wherein the holder includes:
   a lower holder rotatably coupled to a lower end of the slide bracket through a lower shaft; and
   a pair of side holders rotatably installed at both sides of the slide bracket.

4. The display device holder apparatus for the sun visor of claim 3, further including pad members coupled integrally to the side holders and friction-contacting the display device to prevent movement of the display device and prevent damage to the display device.

5. The display device holder apparatus for the sun visor of claim 3, wherein the lower holder is configured to be pivotally rotated around the lower shaft due to a weight of the lower holder to be changed into an open state in which the display device is held, when the slide bracket is changed from a received state into a drawn state.

6. The display device holder apparatus for the sun visor of claim 3, wherein holder protrusions rotating the lower holder to change the lower holder from an open state into a closed state in which the display device is not held by a contact with the base bracket when the slide bracket is changed from a drawn state into a received state protrude integrally with portions of the lower holder through which the lower shaft penetrates.

7. The display device holder apparatus for the sun visor of claim 3, further including:
   a pair of extension brackets slidably installed with respect to the slide bracket in order to enable a state in which the pair of extension brackets is received in the slide bracket and a state in which the pair of extension brackets is drawn toward a left and a right of the slide bracket, respectively; and
   a return spring installed to connect the pair of extension brackets to each other and maintain the pair of extension brackets in a state in which the pair of extension brackets is received in the slide bracket by providing an elastic force to the extension brackets.

8. The display device holder apparatus for the sun visor of claim 7, wherein the side holders is rotatably installed on end portions of the extension brackets through side shafts, respectively.

9. The display device holder apparatus for the sun visor of claim 8, further including holder springs each having one end coupled to each side holder and another end coupled to each extension bracket and providing elastic force to the side holders so that the side holders is continuously closely adhered to the extension brackets in a state in which they is folded.

10. The display device holder apparatus for the sun visor of claim 7, wherein the slide bracket includes
    a front bracket having the guide protrusions formed at both sides thereof; and provided with the stopper, the lower holder, the side holders, and the extension brackets; and
    a rear bracket coupled to the front bracket, covering the front bracket, installed facing the base bracket, and limiting movement of the stopper in order to prevent the stopper from being separated toward the base bracket.

11. The display device holder apparatus for the sun visor of claim 1, wherein the slide bracket is installed positioned on a surface of the sun visor directed toward an interior of the sun visor when the sun visor is folded and closely adhered to a roof panel.

\* \* \* \* \*